US006540277B2

(12) United States Patent
McCoy et al.

(10) Patent No.: US 6,540,277 B2
(45) Date of Patent: Apr. 1, 2003

(54) RECEIVER ASSEMBLY WITH BRUSH BAR

(75) Inventors: Richard W. McCoy, Granger, IN (US); Jacob S. Belinky, Carelton, MI (US); George O. Snook, South Bend, IN (US); Thomas J. Rudasics, Granger, IN (US)

(73) Assignee: Reese Products, Inc., Goshen, IN (US)

( * ) Notice: Subject to any disclaimer, the term of this patent is extended or adjusted under 35 U.S.C. 154(b) by 0 days.

(21) Appl. No.: 09/968,765

(22) Filed: Oct. 2, 2001

(65) Prior Publication Data

US 2002/0050722 A1 May 2, 2002

Related U.S. Application Data

(60) Provisional application No. 60/243,386, filed on Oct. 26, 2000.

(51) Int. Cl.[7] .............................................. B60R 19/48
(52) U.S. Cl. ..................... 293/117; D12/162; 280/495; 280/481.5
(58) Field of Search .......................... 293/117; D12/171, D12/162; 280/495, 475, 491.5, 479.2, 491.1, 507, 479.3; 224/519, 485; 119/701; 248/224.7; 156/83; 482/106; 16/472

(56) References Cited

U.S. PATENT DOCUMENTS

| 2,283,436 | A | | 5/1942 | Hawkins, Sr. | |
|---|---|---|---|---|---|
| 2,525,707 | A | | 10/1950 | Morast | |
| 2,525,964 | A | | 10/1950 | Slaback | |
| 2,880,016 | A | | 3/1959 | Peterson | |
| 3,431,005 | A | | 3/1969 | Priefert | |
| 3,455,574 | A | | 7/1969 | Priefert | |
| 3,768,837 | A | * | 10/1973 | Reese | 280/495 |
| 4,046,398 | A | * | 9/1977 | Dunwoody | 224/519 |
| 4,125,214 | A | * | 11/1978 | Penn | 293/117 |
| 4,168,855 | A | | 9/1979 | Koch | |
| D275,475 | S | | 9/1984 | Turkleson | |
| 4,738,464 | A | * | 4/1988 | Putnam | 293/117 |
| 4,950,010 | A | * | 8/1990 | Denny | 293/117 |
| D333,457 | S | * | 2/1993 | La Foe et al. | D12/171 |
| 5,184,839 | A | * | 2/1993 | Guedry | 280/475 |
| 5,186,125 | A | * | 2/1993 | Halyung | 119/701 |
| D341,117 | S | * | 11/1993 | Sundstedt | D12/162 |
| 5,277,448 | A | * | 1/1994 | Colibert | 280/491.5 |
| 5,322,315 | A | * | 6/1994 | Carsten | 280/479.2 |
| 5,489,111 | A | * | 2/1996 | Collins | 280/491.5 |
| 5,511,813 | A | * | 4/1996 | Kravitz | 280/495 |
| 5,516,140 | A | * | 5/1996 | Hinte | 280/491.1 |
| D373,557 | S | | 9/1996 | Shaw et al. | |
| 5,560,631 | A | * | 10/1996 | Salvo | 280/507 |
| 5,620,198 | A | * | 4/1997 | Borchers | 280/491.5 |
| 5,620,218 | A | * | 4/1997 | Saltzman et al. | 293/117 |
| D379,343 | S | * | 5/1997 | Shaw et al. | D12/162 |
| 5,630,606 | A | * | 5/1997 | Ryan | 280/479.3 |
| 5,636,885 | A | | 6/1997 | Hummel | |
| 5,647,621 | A | | 7/1997 | McClellan | |
| D388,386 | S | | 12/1997 | Sanchez, Jr. | |
| 5,707,072 | A | | 1/1998 | Hopper | |
| 5,775,560 | A | * | 7/1998 | Zahn et al. | 224/485 |
| 5,873,594 | A | * | 2/1999 | McCoy et al. | 280/491.5 |
| 6,007,033 | A | * | 12/1999 | Casson et al. | 248/224.7 |
| D433,357 | S | * | 11/2000 | McCoy et al. | D12/162 |
| 6,235,134 | B1 | * | 5/2001 | Mueller | 156/83 |
| 6,280,364 | B1 | * | 8/2001 | Deac et al. | 482/106 |
| 6,421,879 | B1 | * | 7/2002 | Gratz et al. | 16/422 |

FOREIGN PATENT DOCUMENTS

| GB | 2 187 142 | * | 2/1986 |
|---|---|---|---|
| WO | WO 01/74611 | * | 10/2001 |

* cited by examiner

Primary Examiner—Kiran Patel
(74) Attorney, Agent, or Firm—King & Schickli, PLLC

(57) ABSTRACT

A receiver assembly includes a central frame member including a hitch receiver box, a pair of mounting brackets carried on the central frame member, a pair of accessory receivers carried on said central frame member and a vehicle body guard mounted in the pair of accessory receivers. The vehicle body guard is a continuous tube shaped so as to project above the hitch receiver box so as not to interfere with hitch bar or draw bar connection in that box.

21 Claims, 3 Drawing Sheets

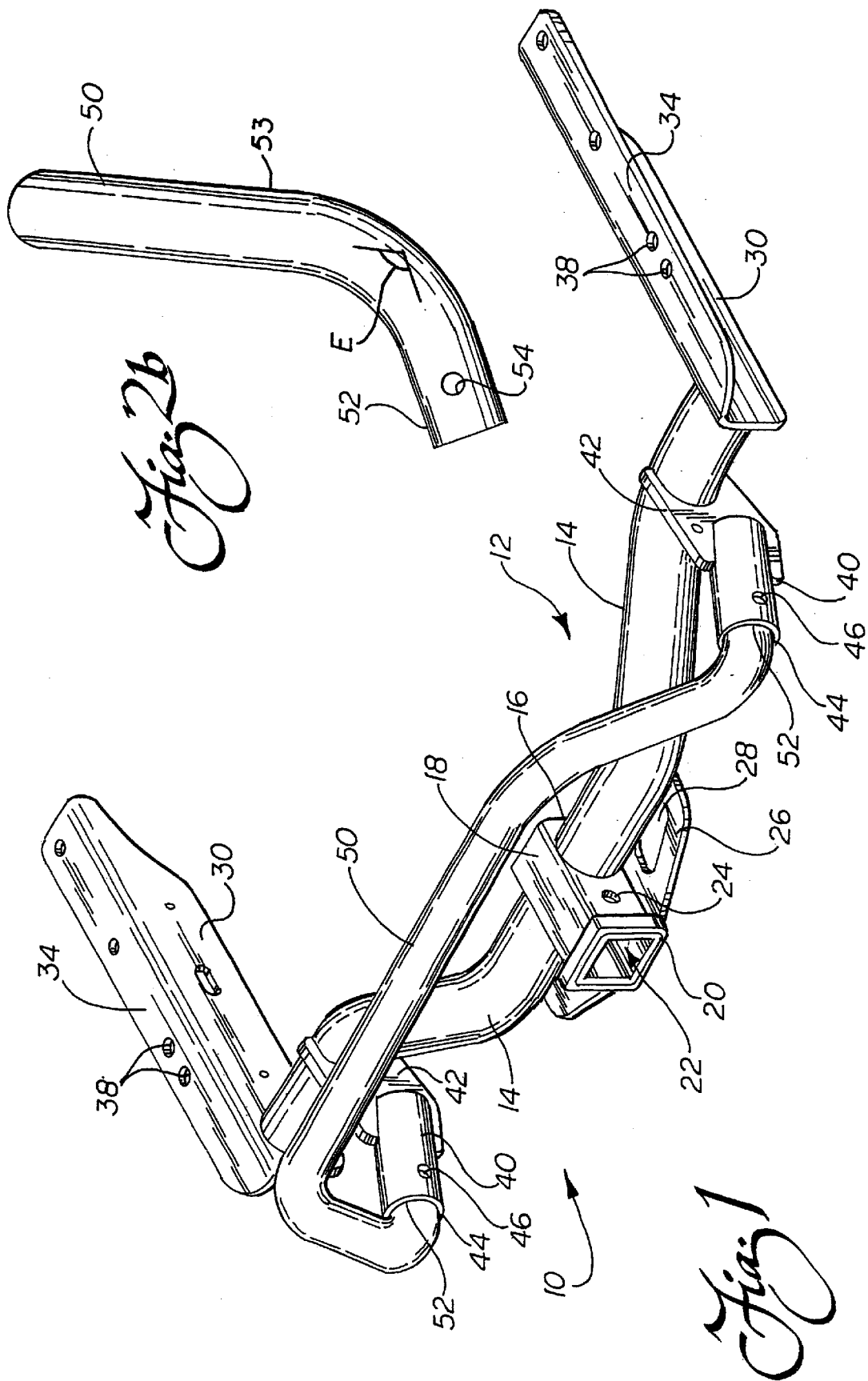

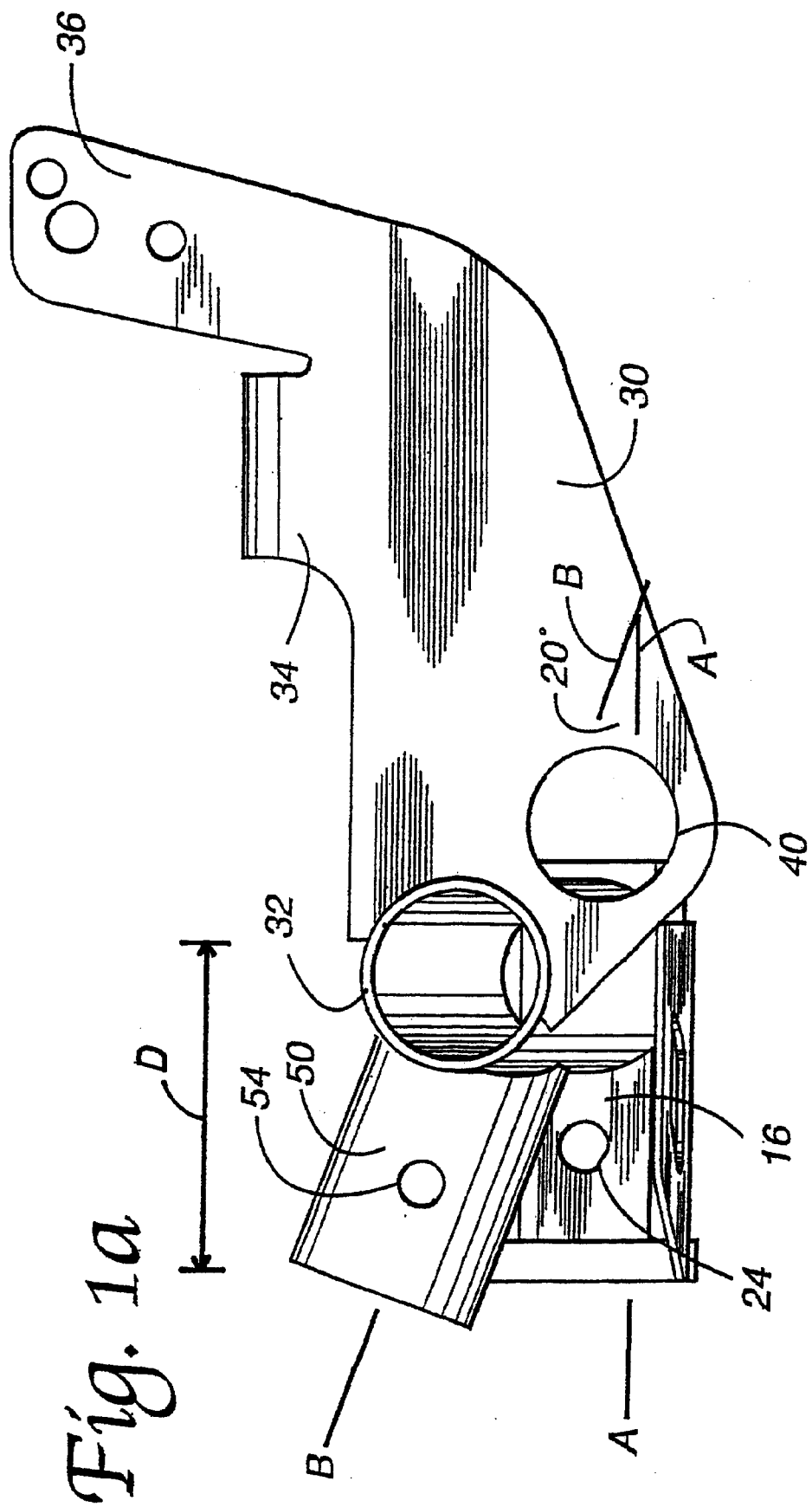

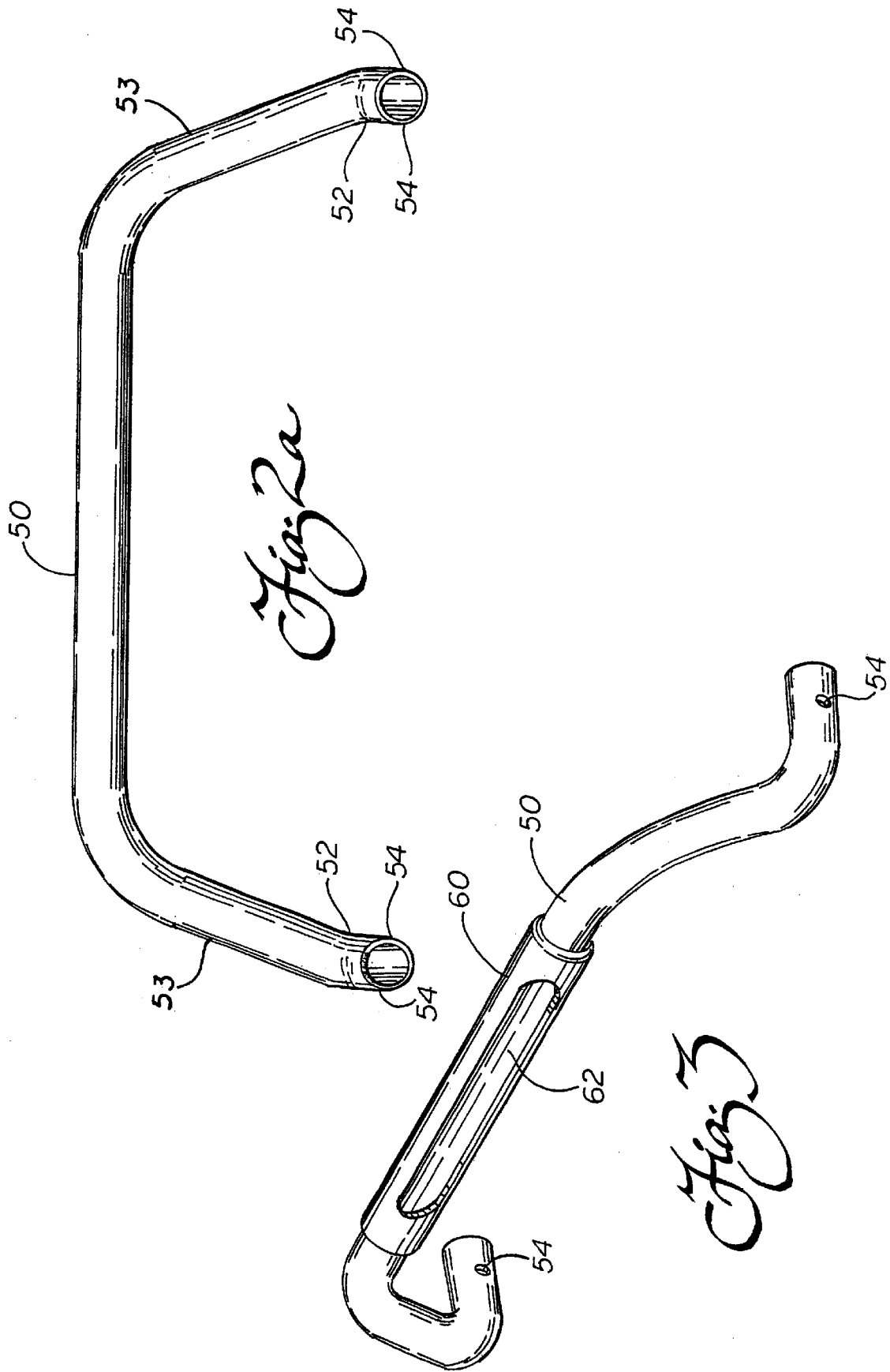

US 6,540,277 B2

RECEIVER ASSEMBLY WITH BRUSH BAR

This patent application claims the benefit of U.S. Provisional Patent Application Serial No. 60/243,386 filed on Oct. 26, 2000.

TECHNICAL FIELD

The present invention relates generally to receiver assemblies and, more particularly, to a receiver assembly incorporating a pair of accessory ports that receive and hold a brush bar.

BACKGROUND OF THE INVENTION

It has long been known to construct towing hitches that are mounted to vehicles in order to allow the towing of trailers or the like. In recent years such hitches have been designed to include a receiver box having a rearwardly directed opening or cavity for the receipt of a hitch or draw bar that carries a hitch ball or other means allowing connection to a trailer. Examples of such a structure include the Insta-Hitch II and Custom Hitch Receiver 35365 as manufactured by Reese Products, Inc. of Elkhart, Ind. Such a hitch receiver is also disclosed in, for example, U.S. Pat. No. 3,768,837 to Reese.

Recent efforts to enhance the versatility of a hitch receiver have led to development of various accessories (e.g., both open and closed article carriers, bike racks, ski racks, tables, winches or other equipment) mounted by means of an accessory mounting bar or lug in the receiver box of a trailer hitch receiver assembly. Because of their convenience and suitability to the particular applications/interests of the user, such accessories have become very popular.

In order to allow for or accommodate trailer towing and accessory mounting simultaneously, a trailer hitch-assembly with both a trailer hitch receiver and towing accessory receivers has been recently developed and is the subject of, for example, U.S. Provisional Patent Application Serial No. 60/194,502, filed Apr. 3, 2000 and No. 60/243,486, filed Oct. 26, 2000. This new receiver assembly includes a central frame member, a mounting bracket carried on each end of the central frame member for securing the central frame member to the vehicle, a hitch receiver box carried on the central frame member and at least one accessory receiver for receiving and holding a recreational and/or utilitarian accessory.

The present invention relates to such a receiver assembly incorporating a brush bar for protecting the bumper and bodywork of the vehicle.

SUMMARY OF THE INVENTION

In accordance with the purposes of the present invention as described herein, an improved receiver assembly is provided. The receiver assembly includes a central frame member that may optionally include a hitch receiver box for receiving a hitch bar or draw bar for towing a trailer. The receiver assembly also includes a pair of mounting brackets carried on the central frame member that allow the receiver assembly to be secured to the frame of the towing vehicle. Additionally, the receiver assembly includes a pair of accessory receivers that are carried on the central frame member. Each of the receivers projects from the central frame member so as to be easily accessible.

Still further, the receiver assembly includes a vehicle body guard mounted in the pair of accessory receivers. This vehicle body guard or brush bar functions to protect the bumper and body work of the vehicle while advantageously maintaining the necessary clearance to allow the free and unfettered use of the hitch receiver box. Accordingly, the vehicle body guard or brush bar may be used even when a hitch bar or draw bar is connected in the hitch receiver box to allow the towing of a trailer.

In accordance with one particular embodiment of the present invention the vehicle body guard or brush bar is a continuous tube which extends between the pair of accessory receivers. That tube is shaped so as to project above the hitch receiver box so that the guard can function to protect the body work of the vehicle when, for example, backing the vehicle toward the trailer in order to complete the hitch connection with the towing ball carried on the hitch bar/draw bar.

In one possible embodiment the pair of accessory receivers are provided with one port carried on the central frame member between each of the mounting brackets and the hitch receiver box. The hitch receiver box has a longitudinal axis extending in a first plane A and each accessory receiver has a second longitudinal axis extending in a second plane B, the planes A and B defining an included angle of from about 10° to about 30° and more specifically, for example, 20°. As will be described in greater detail below, the relative orientation of the accessory receivers with respect to the central frame member, the hitch receiver box and the towing vehicle to which the assembly is mounted insures ease of accessory alignment and mounting for the benefit and satisfaction of the user.

In another possible embodiment the vehicle body guard includes an outer protective sleeve which protects the surface finish of the guard. The sleeve may include an aesthetically pleasing relief feature, elliptical recess or opening if desired.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention and together with the description serve to explain the principles of the invention. In the drawings:

FIG. 1 is a perspective view of the receiver assembly of the present invention;

FIG. 1a is a side elevational view of the receiver assembly of FIG. 1;

FIGS. 2a–2b are respective front and left side elevational views of the vehicle body guard or brush bar that is secured in the accessory receivers of the receiver assembly shown in FIG. 1; and FIG. 3 is a perspective view of an alternative embodiment of the present invention.

Reference will now be made in detail to the present preferred embodiment of the invention, an example of which is illustrated in the accompanying drawings.

DETAILED DESCRIPTION OF THE INVENTION

Reference is now made to FIG. 1 showing a receiver assembly 10. The receiver assembly 10 includes a central frame member or cross member 12 preferably formed from a pair of tubular steel sections 14 welded to the side wall 16 of a centrally located receiver box 18 so as to project outwardly in opposing directions. The tubular steel sections 14 may be formed with a round cross section as shown in the drawing figures, a square cross section or any other appropriate shape providing the necessary strength to function as a receiver assembly.

The receiver box 18 includes a reinforced lip 20 defining an opening leading to a hitch bar receiving cavity 22. Aligned apertures 24 in the opposing side walls 16 of the receiver box 18 allow the secure connection of a hitch bar in the receiver box in a manner well known in the art by means of a connecting pin and cooperating pin clip (not shown). A chain plate 26 of steel material is welded to the receiver box 18 and tubular steel sections 14 in order to strengthen the connection. As is know in the art, chain plate 26 includes two apertures 28. The safety chains of a trailer may be connected to the chain plate 26 through engagement in these apertures 28.

Vehicle mounting brackets 30 are mounted adjacent the distal end of each tubular section 14. More specifically, the brackets 30 are welded to the tubular sections 14 in order to complete the connection. The mounting brackets 30 each include a mounting flange 34 with apertures 38. Nut and bolt fasteners (not shown) are extended through these apertures 38 and cooperating apertures drilled in the frame of the towing vehicle in order to mount the receiver assembly 10 thereto.

As also shown in FIG. 1, the receiver assembly 10 incorporates a pair of accessory receivers 40 carried on the tubular sections 14 of the central frame member 12. Each of the accessory receivers 40 is formed from a steel tube that is welded to a mounting bracket 42 that is, in turn, welded to one of the tubular sections 14 so that one accessory receiver is positioned between the receiver box 18 and each mounting bracket 30.

As shown, each accessory receiver 40 includes a circular port or opening 44 and cooperating aligned apertures 46 in the sidewall thereof to allow secure connection of a vehicle body guard or brush bar 50 by means of a connecting pin and pin clip of a type well known in the art such as utilized to secure the hitch bar in the receiver box 18.

In the illustrated embodiment of FIGS. 1 and 2a–2b, the vehicle body guard or brush bar 50 includes a pair of mounting ends 52 and an intermediate body section 53 in the form of a continuous tube extending between the two receivers 40 into which it is mounted. The vehicle body guard/brush bar 50 is shaped so as to project above the hitch receiver box 18 providing the necessary clearance to allow the cavity 22 to remain open for the receipt of a hitch bar or draw bar. As such, the vehicle body guard/brush bar 50 may be used without interfering with trailer towing. In fact, the guard/bar 50 conveniently protects the rear bumper and body panels of the towing vehicle when connecting and disconnecting the trailer.

In use, each of the accessory receivers 40 is oriented with respect to the central frame member 12, receiver box 18 and the towing vehicle upon which the assembly 10 is mounted so as to be readily accessible by the towing vehicle operator. More specifically, the hitch receiver box 18 has a longitudinal axis extending in a first plane A and each accessory receiver 40 has a longitudinal axis extending in a second plane B (see FIG. 1a). The planes A and B define an included angle of from about 10° to about 30° and more specifically, for example, 20°.

The manner in which the structural arrangement of the accessory receivers 40 benefits the user when attempting to attach a recreational and utilitarian accessory will now be more completely explained. When the receiver assembly 10 is mounted to the frame of a towing vehicle, the sections 14 of the central frame member 12 are positioned directly under the bumper of the vehicle. Both the receiver box 18 and the accessory receivers 40 project rearwardly from the sections 14 a distance D so as to extend to or beyond the rearmost edge of the bumper. Additionally, the accessory receivers 40 project upwardly at an acute angle of, for example, from about 10° to about 30° or even about 20° with respect to the receiver box 18 and the horizontal. Thus, the circular ports or openings 44 of the accessory receivers 40 are both readily visible and accessible.

Due to this fact, it is relatively easy for the user to engage the openings 44 of the accessory receivers 40 with the mounting ends 52 of the vehicle body guard or brush bar 50. At this point, the circular shape of the accessory receivers 40 and cooperating mounting ends 52 further insure ease of connection. Specifically, since the ends 52 and receivers 40 are both round, they present continuous, uninterrupted mating sidewalls. Accordingly, it is not necessary to index the mounting ends 52 in any way to insure proper geometry for mating; simple alignment is all that is necessary. Additionally, the mounting ends 52 may be flexed slightly in virtually any direction during mating as an additional aid when making the connection.

Once properly aligned, the mounting ends 52 slide readily into the receivers 40. When fully seated, cross apertures 54 in the ends 52 are in alignment with the apertures 44. A connecting pin (not shown) is then positioned in these apertures and a pin clip (not shown) is used to secure the pin in position. One such cooperating connecting pin and pin clip is used to secure each mounting end 52 in each receiver 40. The resulting two point connection through the receivers 40 dramatically increases the stability of the connection between the vehicle body guard or brush bar 50 and the vehicle. Of course, the vehicle body guard/brush bar 50 may be easily removed by removing the pin clips and connecting pins and pulling the ends 52 from the receivers 40.

An alternative embodiment of the present invention is shown in FIG. 3. The alternative embodiment of FIG. 3 is identical to the embodiment illustrated in FIGS. 1 and 2a–2b except for the provision of a protective outer sleeve 60 received over the central or intermediate portion of the body guard/brush bar 50 between the ends 52. The sleeve 60 may be made of rubber, plastic or other surface finish protecting material. The sleeve 60 incorporates an aesthetically pleasing elliptical recess or opening 62 while protecting the surface finish of the body guard/brush bar 50 from bumps and nicks.

In either embodiment of the body guard/brush bar, it should be appreciated that the ends 52 each form an included obtuse angle E in a vertical plane of between, for example, from about 1000 to about 1200 (e.g. 110°) with the intermediate body section 53. In this way, the body guard/brush bar 50 is properly oriented when mounted in the upwardly angled accessory receivers 40 carried on the receiver assembly 10. In the illustrated embodiment the portions of the intermediate body section 53 adjacent the ends 52 are converging (see FIG. 2a). It should, however, be appreciated that they could just as easily be parallel or diverging if desired for a particular aesthetic purpose or actual application.

The foregoing description of two possible embodiments of the invention has been presented for purposes of illustration and description. It is not intended to be exhaustive or to limit the invention to the precise form disclosed. Obvious modifications or variations are possible in light of the above teachings. For example, the ends 52 of the vehicle body guard/brush bar 50 may be secured in a T-shaped adapter having a mounting bar adapted for securing in the hitch receiver box 18. Alternatively, the receiver assembly 10 might comprise a single piece cross member 12 with or without a receiver box 18 but otherwise remain unchanged.

The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A receiver assembly for a vehicle, comprising:
   a central frame member including a hitch receiver box having a first longitudinal axis extending in a first plane A;
   a pair of mounting brackets carried on said central frame member;
   a pair of accessory receivers carried on said central frame member, each receiver of said pair of accessory receivers projecting from said central frame member and having a second longitudinal axis extending upwardly in a second plane B; and
   a vehicle body guard mounted in said pair of accessory receivers.

2. The receiver assembly of claim 1, wherein said hitch receiver box remains open for receipt of a hitch bar/draw bar when said vehicle body guard is mounted in said pair of accessory receivers.

3. The receiver assembly of claim 1, wherein said vehicle body guard is a continuous tube extending between said pair of accessory receivers.

4. The receiver assembly of claim 1, wherein said vehicle body guard is a continuous tube extending between said pair of accessory receivers and shaped so as to project above said hitch receiver box.

5. The receiver assembly of claim 1, wherein one receiver of said pair of accessory receivers is carried on said central frame member between each of said mounting brackets and said hitch receiver box.

6. The receiver assembly of claim 5, wherein said hitch receiver box has a first longitudinal axis extending in a first plane A and each receiver of said accessory receivers has a second longitudinal axis extending in a second plane B, said planes A and B defining an included angle of from about 10° to about 30°.

7. The receiver assembly of claim 5, wherein said hitch receiver box has a first longitudinal axis extending in a first plane A and each receiver of said accessory receivers has a second longitudinal axis extending upwardly in a second plane B, said planes A and B defining an included angle of approximately 20°.

8. The receiver assembly of claim 5, wherein said hitch receiver box and said pair of accessory receivers project rearwardly from said central frame member a distance D.

9. A receiver assembly for a vehicle, comprising:
   a central frame member;
   a pair of mounting brackets carried on said central frame member;
   a pair of accessory receivers carried on said central frame member, each receiver of said pair of accessory receivers projecting from said central frame member and having a longitudinal axis extending upwardly from a horizontal plane; and
   a vehicle body guard mounted in said pair of accessory receivers.

10. The receiver assembly of claim 9, wherein said vehicle body guard is a continuous tube extending between said pair of accessory receivers.

11. The receiver assembly of claim 9, wherein one receiver of said pair of accessory receivers is carried on said central frame member between each of said mounting brackets and said hitch receiver box.

12. The receiver assembly of claim 9, wherein said longitudinal axis of each receiver of said accessory receivers defines an included angle of from about 10° to about 30° with the horizontal plane.

13. The receiver assembly of claim 12, wherein said included angle is approximately 20°.

14. A vehicle body guard for a receiver assembly, comprising a pair of mounting ends carried on an intermediate body section, each of said mounting ends defining an included obtuse angle with said intermediate body section.

15. The vehicle body guard of claim 14, wherein said obtuse angle is from about 100° to about 120°.

16. The vehicle body guard of claim 14, wherein said obtuse angle is about 110°.

17. The vehicle body guard of claim 14, wherein said vehicle body guard is a continuous tube.

18. A receiver assembly for a vehicle, comprising:
   a central frame member including a hitch receiver box;
   a pair of mounting brackets carried on said central frame member;
   a pair of accessory receivers carried on said central frame member, each receiver of said pair of accessory receivers projecting from said central frame member; and
   a vehicle body guard mounted in said pair of accessory receivers, said vehicle body guard including a protective sleeve covering a portion of said vehicle body guard.

19. The receiver assembly of claim 9, wherein said protective sleeve includes an elliptical opening.

20. A receiver assembly for a vehicle, comprising:
   a central frame member;
   a pair of mounting brackets carried on said central frame member;
   a pair of accessory receivers carried on said central frame member, each receiver of said pair of accessory receivers projecting from said central frame member; and
   a vehicle body guard mounted in said pair of accessory receivers said vehicle body guard including a protective sleeve covering a portion of said vehicle body guard.

21. The receiver assembly of claim 20, wherein said protective sleeve includes an elliptical opening.

* * * * *

UNITED STATES PATENT AND TRADEMARK OFFICE
CERTIFICATE OF CORRECTION

PATENT NO.    : 6,540,277 B2
DATED         : April 1, 2003
INVENTOR(S)   : Richard W. McCoy et al.

It is certified that error appears in the above-identified patent and that said Letters Patent is hereby corrected as shown below:

<u>Column 6,</u>
Lines 26-34, cancel claims 14-17.

Signed and Sealed this

Thirteenth Day of April, 2004

JON W. DUDAS
*Acting Director of the United States Patent and Trademark Office*